(No Model.)

G. L. SLATER.
WAGON BRAKE LEVER.

No. 254,781. Patented Mar. 7, 1882.

Witnesses.
Edwin L. Yewell.
J. J. McCarthy.

Inventor.
George L. Slater,
By C. A. Alexander
Attorney.

UNITED STATES PATENT OFFICE.

GEORGE L. SLATER, OF BUCHANAN, MICHIGAN, ASSIGNOR OF ONE-HALF TO JOSEPH L. RICHARDS, OF SAME PLACE.

WAGON-BRAKE LEVER.

SPECIFICATION forming part of Letters Patent No. 254,781, dated March 7, 1882.

Application filed December 14, 1881. (No model.)

*To all whom it may concern:*

Be it known that I, GEORGE L. SLATER, of Buchanan, in the county of Berrien, and in the State of Michigan, have invented certain new and useful Improvements in Lever-Locks for Wagon-Brakes; and I do hereby declare that the following is a full, clear, and exact description thereof, reference being had to the accompanying drawings, and to the letters of reference marked thereon, making a part of this specification.

This invention relates to improvements which are applicable to wagon-brakes, and which are designed for locking the brakes and holding them in contact with the wheels under any desired pressure.

In carrying out my invention I employ a toothed segment or rack, which is rigidly secured to the side of a wagon-body, a vibrating hand-lever to which the brake-rod is attached, a link connecting the lever to the fulcrum, a pawl or tooth, a guard or arm and a stop-pin, which are rigidly fixed to said lever, and a pressure-spring applied to the arm for drawing the lever and pawl back in position for locking, all as will be fully understood from what follows.

Figure 1:
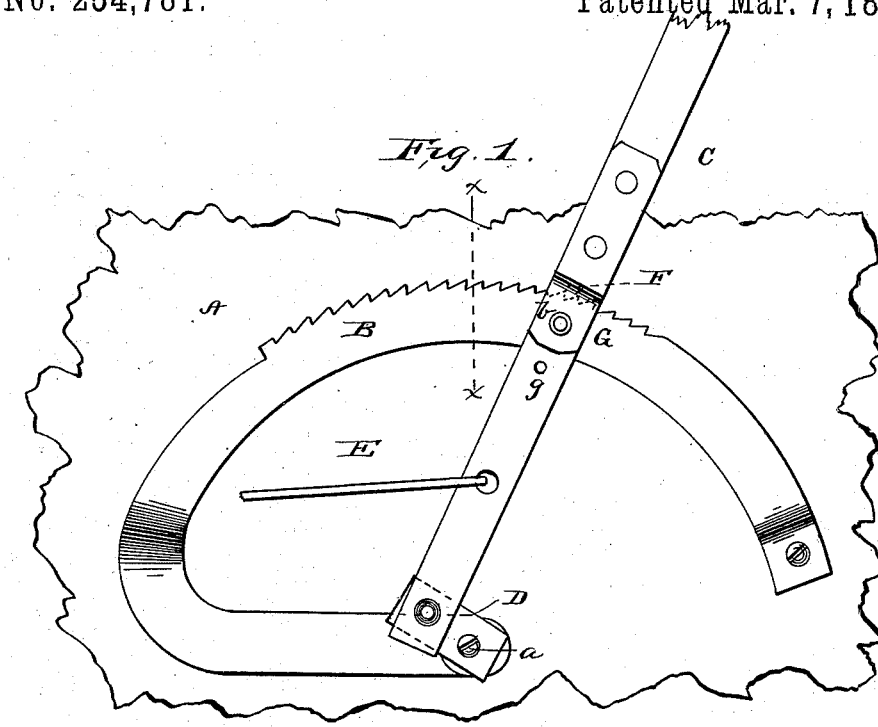
Figure 2:
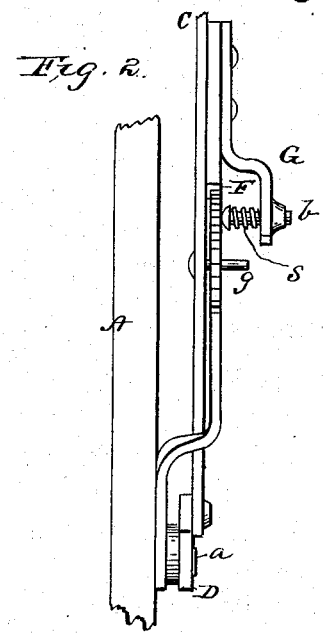
Figure 3:
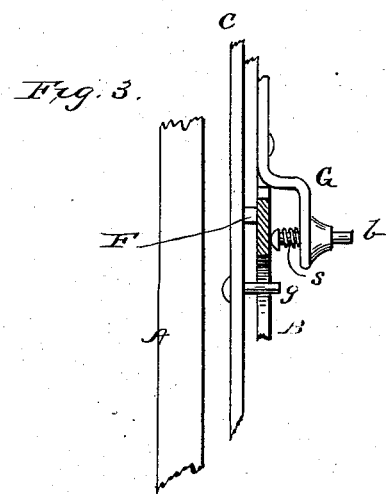

In the accompanying drawings, Figure 1 is a side view, showing my new locking device applied to part of the side of a wagon-body. Fig. 2 is an edge view of Fig. 1. Fig. 3 is a vertical cross-section through dotted line *x x* of Fig. 1.

The letter A designates part of one side of a wagon-body, to which is rigidly secured a segment, B, having teeth on its upper edge, which are pitched toward the front of the wagon. The curved part of the segment B is set off from the side of the wagon to allow free lateral play as well as a vibrating and an up-and-down movement to be given to a hand-lever, C. The lower end of this lever C is connected by a short link, D, to an extension of segment B by a pivot screw or bolt and washer, *a*. Lever C is connected by a rod, E, to the brakes in any suitable manner.

F designates a tooth or pawl, which is intended to engage with one or the other of the teeth of segment B, and which is rigidly secured to the outer side of the lever C above the segment.

G designates an arm or guard, which is rigidly secured to lever C, and which extends down over the segment B, and has a pin, *b*, applied to it, the inner end of which is pressed against the segment by a helical spring, *s*.

It will be seen that lever C is allowed to receive a forward-and-backward movement, and that it also has a lateral movement for the purpose of uncoupling the pawl from the teeth. The link or double joint at the bottom of lever C allows it and the pawl to drop after the latter is moved sidewise and disconnected from the segment-teeth. After the lever is drawn back the pawl is thrown in position directly back of the teeth by its spring. A pin, *g*, on lever C prevents this lever from being raised too high.

Having described my invention, I claim—

1. The combination of the toothed segment B, the lever C, and its short pivoted link D, substantially as described, with the rod E, for the purpose set forth.

2. The combination of the toothed segment B, the lever C, its short link D, pivoted to an extension of said segment, the rod E, the arm F, and the spring-actuated pin *b*, substantially as described.

In testimony whereof I affix my signature, in presence of two witnesses, this 7th day of December, 1881.

GEO. L. SLATER.

In presence of—
JOHN C. DICK,
A. A. WORTHINGTON.